Figure 1:
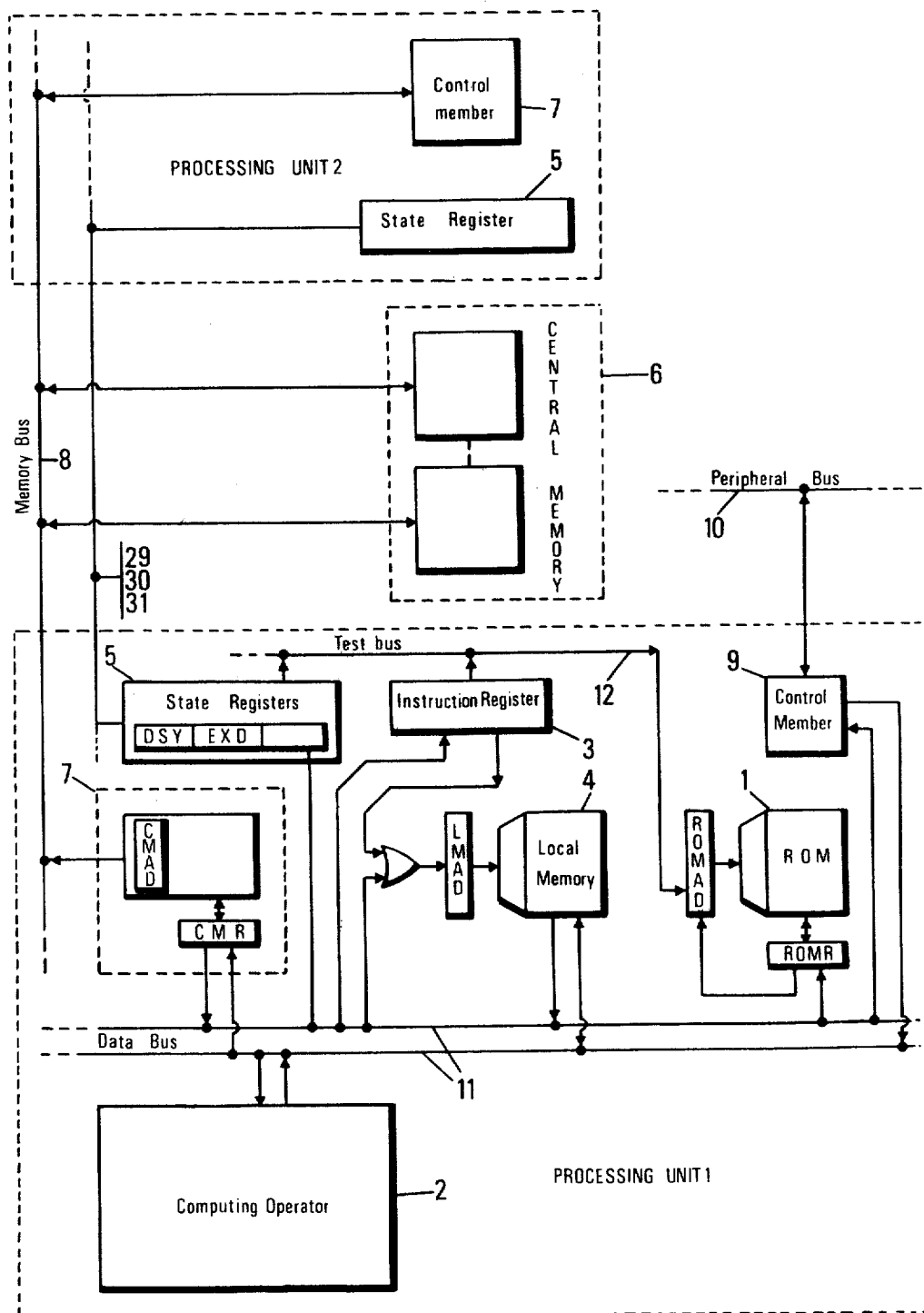

United States Patent [19]

Anceau et al.

[11] 4,015,242
[45] Mar. 29, 1977

[54] DEVICE FOR COUPLING SEVERAL DATA PROCESSING UNITS TO A SINGLE MEMORY

[75] Inventors: Francois Anceau, Gieres; Claude Beauducel, Franconville; Pierre Courboulay, Paris; Jacques Cretin, Le Chesnay, all of France

[73] Assignee: Institut Francais du Petrole, des Carburants et Lubrifiants et Entreprise de Recherches et d'Activities Petrolieres Elf, France

[22] Filed: Apr. 28, 1976

[21] Appl. No.: 681,249

Related U.S. Application Data

[63] Continuation-in-part of Ser. No. 416,401, Nov. 16, 1973, abandoned.

[30] Foreign Application Priority Data

Nov. 29, 1972  France .............................. 72-42516

[52] U.S. Cl. ............................................ 340/172.5
[51] Int. Cl.² ........................................ G06F 15/16
[58] Field of Search ...................... 340/172.5; 445/1

[56] References Cited

UNITED STATES PATENTS

| | | | |
|---|---|---|---|
| 3,421,150 | 1/1969 | Quosig et al. ................... | 340/172.5 |
| 3,480,914 | 11/1969 | Schlaeppi ...................... | 340/172.5 |
| 3,541,520 | 11/1970 | Mullery et al. ................. | 340/172.5 |
| 3,560,934 | 2/1971 | Ernst et al. ..................... | 340/172.5 |
| 3,593,300 | 7/1971 | Driscoll et al. ................. | 340/172.5 |
| 3,648,253 | 3/1972 | Mullery et al. ................. | 340/172.5 |
| 3,735,360 | 5/1973 | Anderson et al. .............. | 340/172.5 |
| 3,753,234 | 8/1973 | Gilbert et al. .................. | 340/172.5 |
| 3,916,383 | 10/1975 | Malcolm ......................... | 340/172.5 |

*Primary Examiner*—Mark E. Nusbaum
*Attorney, Agent, or Firm*—Craig & Antonelli

[57] ABSTRACT

A device for coupling several data processing units to a central memory, the processing units being each provided with means for exchanging data with peripheral devices and with computing means, the device includes management means for controlling the sequential execution of orders issued from the memory, according to a hierarchical classification of the lists of tasks for the exchange processes and the computing process and further includes devices for commutation upon control of decoding means of a signal produced by the processing units, in accordance with the value of a binary digit associated to a task of a fresh list of actuatable tasks established in a non-hierarchical system.

7 Claims, 8 Drawing Figures

DEVICE FOR COUPLING SEVERAL DATA PROCESSING UNITS TO A SINGLE MEMORY

This is a Continuation-In-Part application of application Ser. No. 416,401, filed Nov. 16, 1973, now abandoned.

This invention concerns a device for coupling to a single memory several processing units.

Each processing unit comprises, as a general rule, a computation unit and a processing system which executes orders supplied by a central memory and exchanges informations with external peripheral devices through exchange units under control of a logic unit for synchronizing elementary exchanges, actuated by a microprogram.

The operation of each processing unit comprises the use of computing programs and so-called "channel" programs relating to the conveyance to the computer of data issued from peripheral devices and to the transmission of results to the same devices.

In order to avoid conflicts which may arise in the coordinated execution of the computing programs and of the channel programs and for taking into account the priority orders, the operation of each processing unit comprises the use of an assembly of specific microprograms, of "words" of the memory and of binary digits indicating the state, adapted to manage different processes and which are called "potential processors".

Each processor may be in one of the following states:
available, i.e. having no program to execute,
actuatable, i.e. waiting the availability of the processing system for executing a program,
active, i.e. using the processing system,
in waiting conditions, i.e. waiting the end of a data transfer and remaining inoperative even if it has tasks in the waiting list.

The computing processor may also be in one of the above-mentioned states except in "waiting condition" and can never be stopped for this purpose.

The state of a processor is determined by a list associated therewith and which comprises at least one task which can be executed thereon.

By a task, we intend the association of a program conceived for performing a certain process and a control block in the central memory. This control block is also called "task describer" and consists of an assembly of words in the central memory which defines one task and are used either for executing said task or preserving it in case of interruption.

Each task may be in one of the following states:
available, which means that the corresponding operations are terminated or have not still started,
actuatable, i.e. which is in the waiting list of its processor and cannot be carried out until the latter has terminated the task already in progress,
active, i.e. being performed by its processor,
in waiting condition, which means that its returns to the waiting list of a processor will depend on one or more external factors.

The operation of potential processors in a computing device thus requires a system for:
creating a hierarchy between the processors and making the processing system available to the processor having priority,
making waiting lists of the tasks associated to each processor and managing them.

As it will be furtherstated in the following description each computer comprises a data processing system, a central memory connected to the processing system, means for exchanging data with peripheral devices according to at least one data transfer channel and a microprogrammed automatic device for controlling, on the one hand, the exchange processes performed through said transfer channel and a computing process and for managing, on the other hand, the tasks associated with the computing process and to the exchange processes.

The automatic device comprises a first managing automatic system for controlling the performance of instructions issued from the memory, a second automatic system for establishing a hierarchy between the lists of tasks associated with exchange processes of the same type and with computing processes and making the processing system available to the task heading the priority task list and a third automatic management system for making non-hierarchized lists of the actuatable tasks associated with different processes of the same type and managing them.

The microprogrammed automatic unit comprises means for controlling and testing a first unit for memorizing the state of the lists of tasks associated with the computing and exchange processes, as also a second memorization unit when the priority is given to one of said lists of tasks and a third unit for memorizing the active process.

When we connect on a single memory several processing units, each of them will have its own peripheral units. The channel programs are then attributed not only to a potential processor but also to a specific processing unit. On the contrary, a computation program is executed on anyone of the computing processors.

The central memory is provided, at a fixed address, with a word defining the first actuatable task selected for each processor and with a binary digit defining whether the processor with which the task is associated is or not actuatable. The coupling device must comprise means for synchronizing the dialogue between the processing units and the memory, and furthermore means for synchronizing the task managing automatic systems of the processing units.

The coupling device is remarkable in that it comprises commutation devices respectively associated to the processing units and each comprising a number of outputs equal to the number of these units. It also comprises decoding means for actuating the commutation, through said commutation devices of an actuation signal produced by a third automatic system of any processing unit for actuating the second memorization unit of one of the processing units in accordance with the value of a binary number associated to a task pertaining to the list newly established by said third unit.

Figure 2:
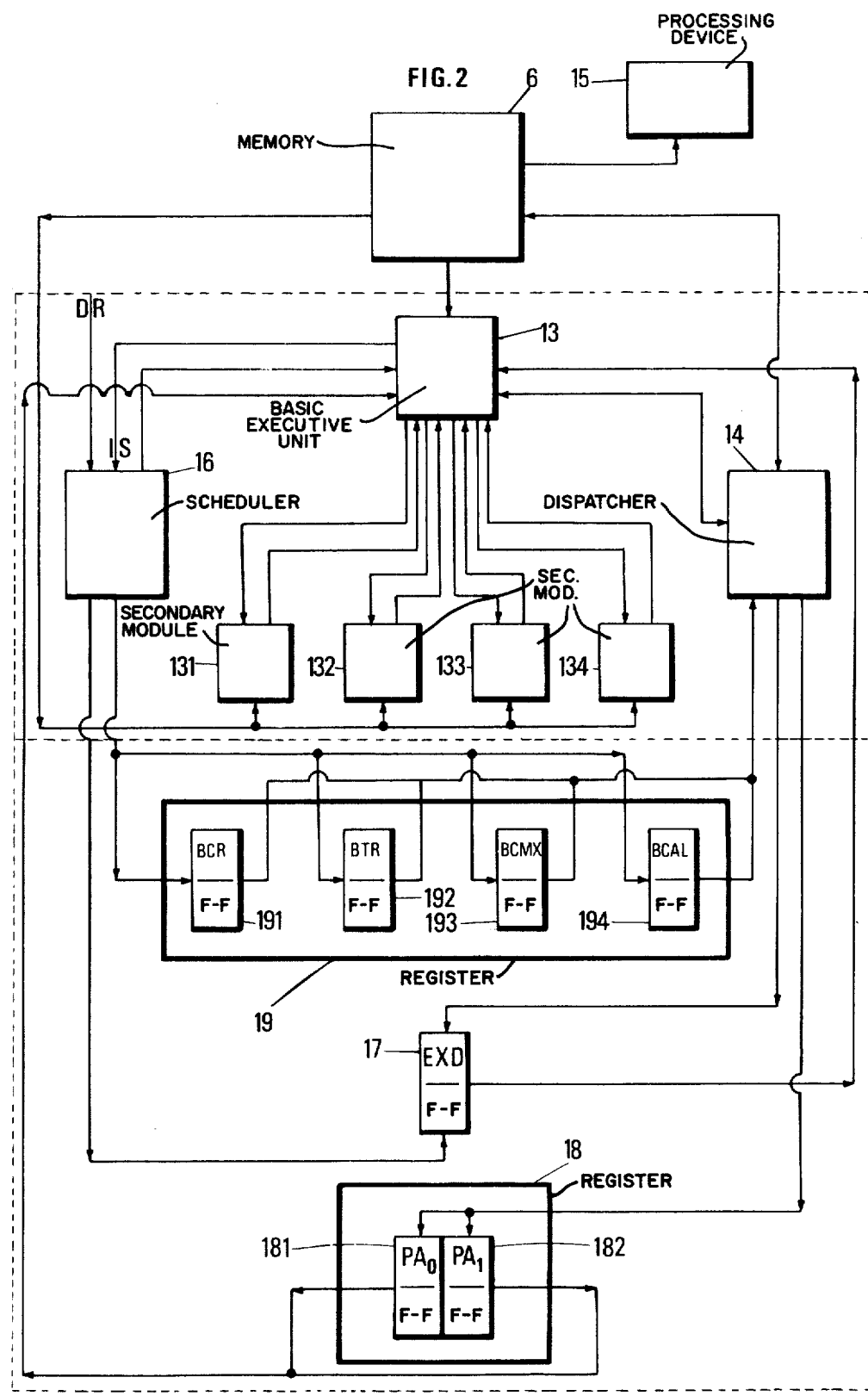
Figure 3:
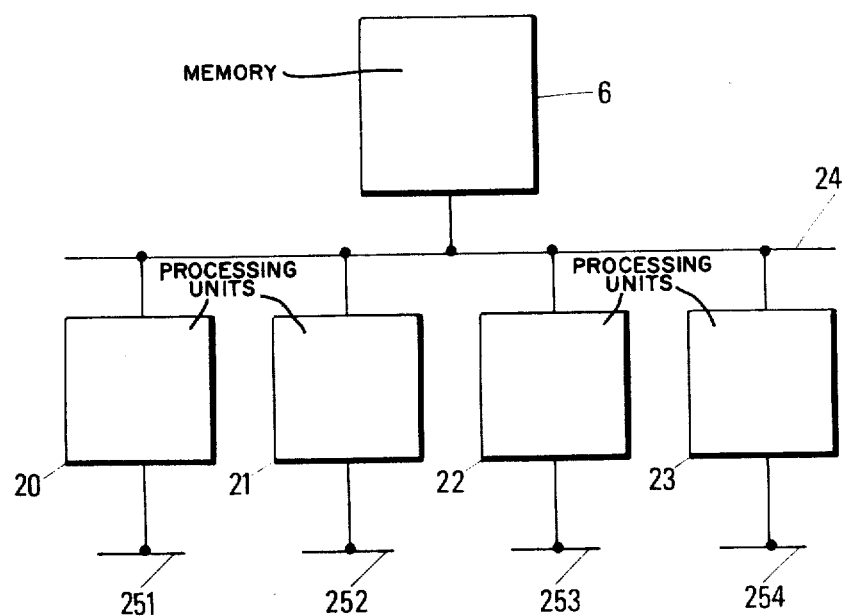
Figure 4:
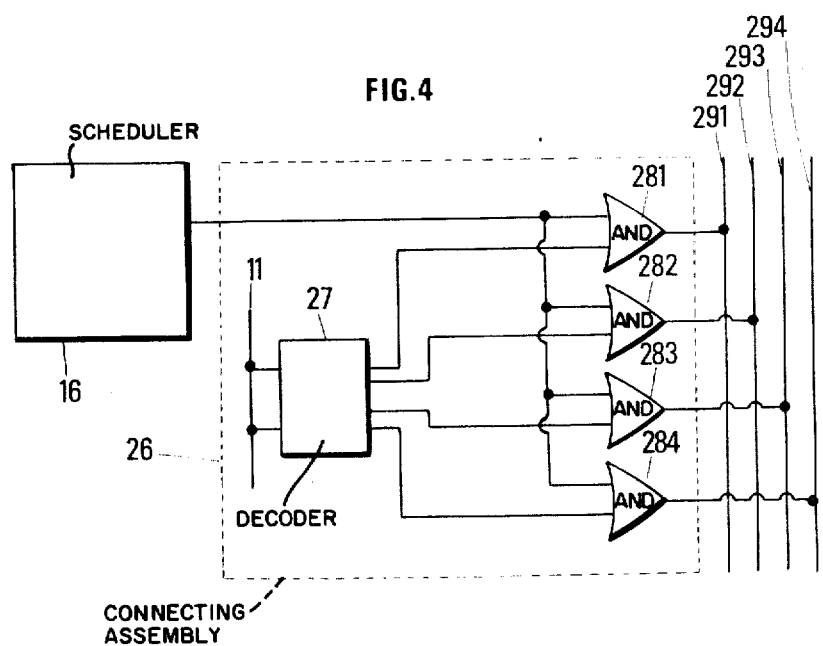
Figure 5:
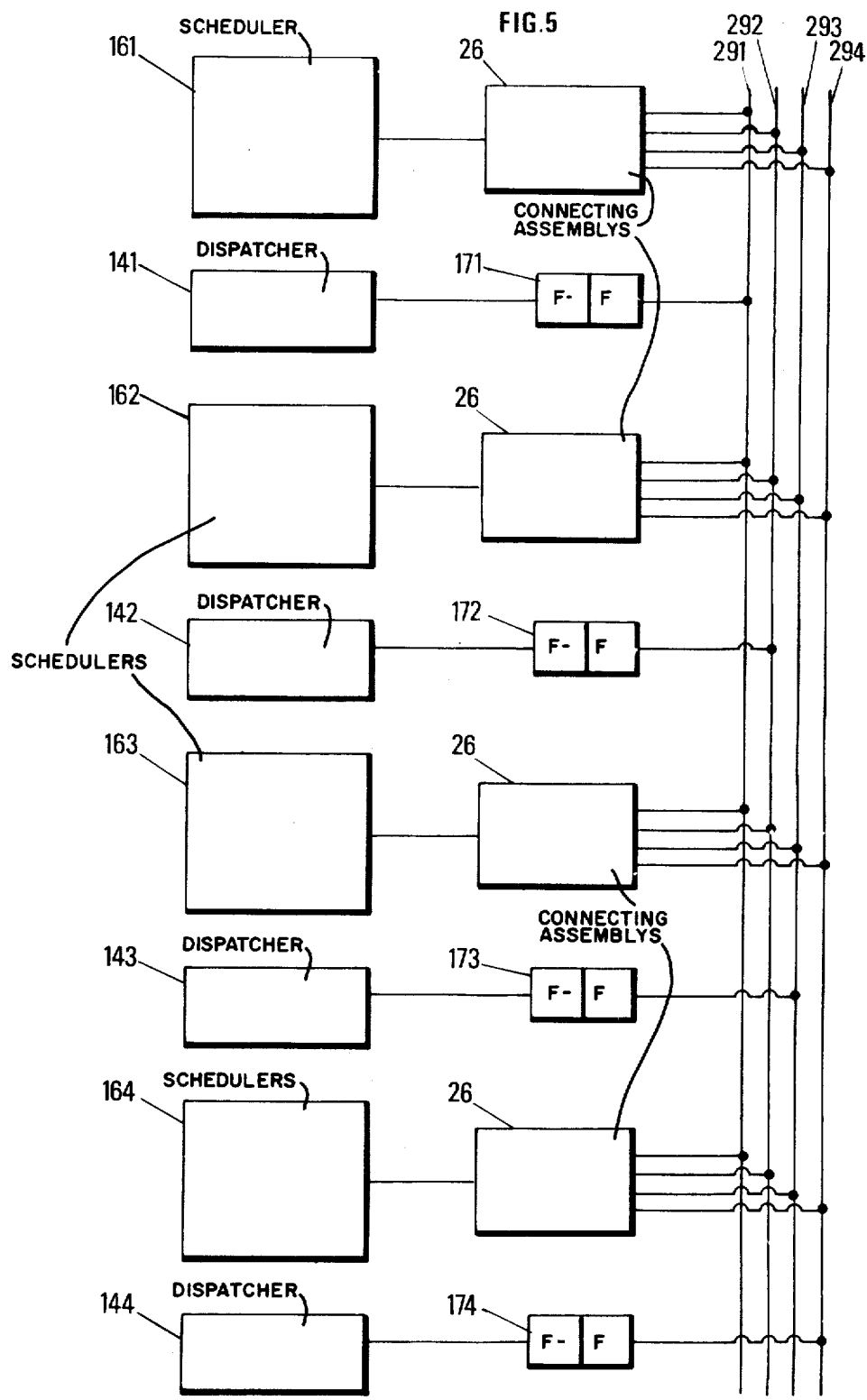
Figure 6:
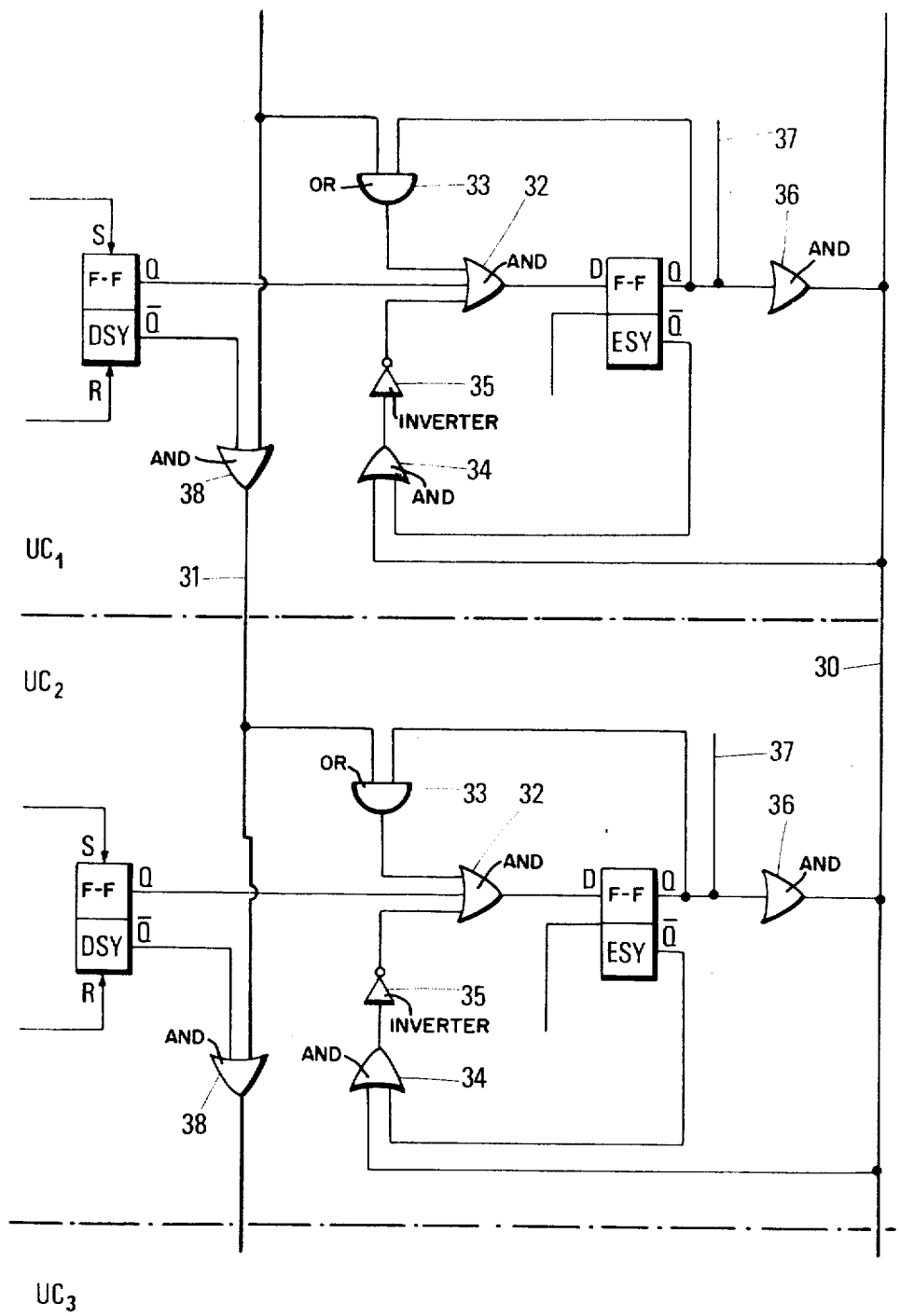
Figure 7:
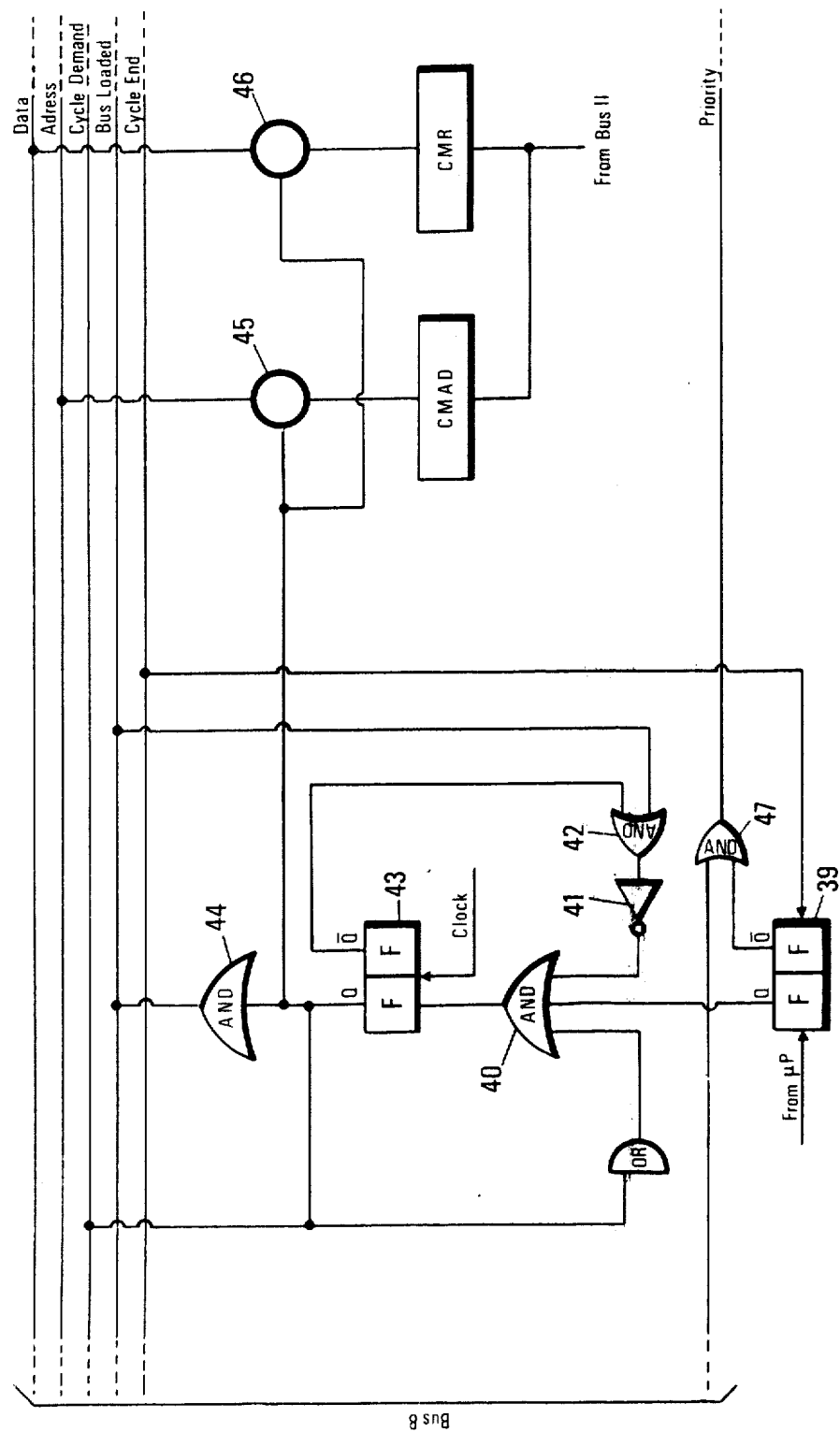
Figure 8:
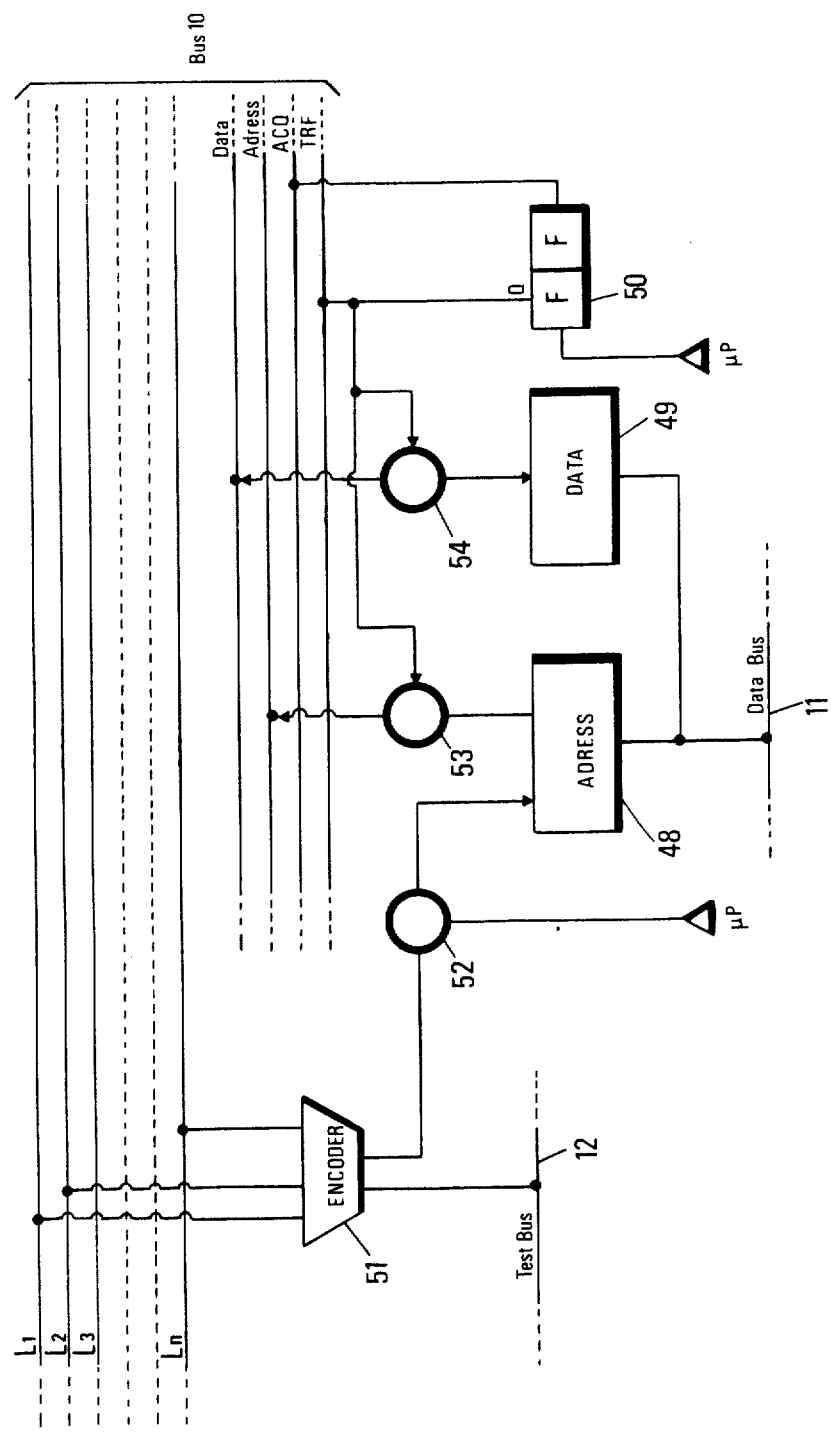

Other features and advantages of the device according to the invention will be made apparent from the following description of a non-limitative embodiment thereof, as illustrated by the accompanying drawings in which:

FIG. 1 diagrammatically shows the arrangement of a processing unit,

FIG. 2 diagrammatically shows the elements of the microprogrammed automatic unit associated to state registers in the case where each processing unit comprises four potential processors, FIG. 3 diagrammatically shows several processing units coupled to a single central memory, FIG. 4 diagrammatically shows the units of the coupling device, associated with all of the processing units in order to permit the dialogue between them and the memory, FIG. 5 diagrammatically shows a general view of the coupling device, FIG. 6 diagrammatically shows a system for synchronizing the demands for commutation between the processing units and the memory, FIG. 7 diagrammatically shows a control member for the central memory, and FIG. 8 diagrammatically shows a control member for controlling data transfer between a processing unit and peripherals.

The microprogrammed processing unit illustrated in FIG. 1 comprises a dead or read-only memory (ROM) 1 for registering microprograms, an arithmetic and logic unit consisting in at least one computing operator 2 a register for instructions 3 and a local memory with registers 4. It also comprises an assembly 5 of state registers and a member 9 for controlling the data transfer between the processing unit and peripherals (not shown) through a peripheral bus 10.

Transfers between each processing unit and a central memory 6 are conveyed through a memory cable 8 and a control member 7. Exchange between the different elements of the processing unit are achieved through at least one data bus 11.

Interconnections between processing unit are dispatched through bus cables 29, 30, 31 as shown in FIGS. 4–7. The assembly of state registers 5, the instruction register 3 and the ROM 1 are interconnected through a test bus 12. Data relative to the state of the processing unit are directed to the ROM which sequentially links up the issued micro-instructions.

The memory for micro-programs is conventionally made of diode matrices and is associated with a register ROMR for decoded extracted micro-instructions and with an address register ROMAD.

The computing operator 2 is for example of the type described in U.S. Pat. No. 3,861,585. The local memory 4 is associated with an address register LMAD. The assembly of state registers, the instruction register 3 and the local memory are of known constructions.

It can be seen in FIG. 2 that the dead memory 1 is subdivided in 3 parts or modules.

It comprises a block for the execution of standard orders, which, associated to the processing device 15, makes it possible to interpret and execute instructions issued from the central memory 6. This block comprises a main micro-program module 13 called "basic executive unit" and four specialized secondary microprogram modules 131, 132, 133 and 134 for executing the instructions specifically relative to each processor of the device.

The main module and the three secondary modules are connected to the main memory 6. The four secondary units 131–134 are controlled by the main module and transmit thereto signals when the instructions given to them have been executed on the corresponding processors.

The four secondary units concern four potential processors which may be, for example, one channel processor CR adapted to a quick transmission of data, a processor TR adapted to computation in real time, a channel processor CMX adapted to process of multiplexed information and a computation processor CAL.

The two other modules of the dead memory are:

a block 14 consisting of a microprogrammed automatic system for establishing a hierarchy between the processors or still between the lists of tasks which are respectively associated therewith and for making the processing system 15 (computing unit) consisting of the operator 2, the instruction register 3 and the memory with registers 4 (FIG. 1), available for the processor having priority (dispatcher), and a block 16 consisting of an automatic microprogrammed system for establishing waiting lists of the actuatable tasks associated with each processor and managing the same (scheduler).

The block 14 is connected to memory 6 and to the basic executive unit 13. The block 16 is also actuated by the basic unit 13 when the latter includes in its microprogram a "system" instruction IS, i.e. an actuating instruction relating to one or more tasks to be executed.

The management block 16 is arranged in order to permit a maximum use of the computing system and in particular the creation of a hierarchical system of the tasks. It includes means for temporarily deferring a task, excluding the same from the waiting list and including it again subsequently.

Among the tasks contained in a waiting list, some of them may have been the object of separate demands. They are called "resource demands". In order to take into account the successive demands, the management block 16 comprises means for memorizing the same in the "describer" of the relevant task.

The management block 16 also comprises a system for detecting one instruction indicating the end of the operations relating to a task and for excluding or reincluding the same in accordance with the fact that all the successive resource demands have or not been satisfied. In the case where a task which is different but assumed by the same processor, is demanded, the task management block 16 comprises means for introducing the describer of said task in the waiting list.

The assembly 5 of the state registers comprises a first register 19 with four bistable flip-flops BCR (191), BTR (192), BCMX (193) and BCAL (194) respectively associated with four processors, CR, TR, CMX and CAL and actuated by the management block 16. The management block 14 comprises means for testing the state of these four flip-flops.

The assembly 5 of state registers also comprises a flip-flop EXD (17) which is actuated by the management blocks 14 and 16 and tested by the basic executive unit 13 and a register 18 comprising two associated bistable flip-flops PAO (181) and PAI (182). The four different binary digits they may represent in association corresponding respectively to the four processors. The two flip-flops are controlled by the management block 14 and may be tested by the basic module 13 of the block for executing standard orders. The same basic module 13 comprises means for testing the flip-flop EXD.

The registers 18 and 19 and the flip-flop 17 of the assembly 5 of the state registers provide for the synchronization of the different blocks of the microprogrammed memory 1.

The number indicated in the register 18 defines the nature of the active processor. The flip-flop EXD is activated by the management block 16 when the latter has controlled the passage from a priority processor to the actuatable state. By testing the flip-flop EXD, the basic module 13 of the execution block detects any modification in the configuration of the actuatable processors and, in this case, actuates the block 14 which defines the hierarchy between the processors.

The four flip-flops BCR, BTR, BCMX and BCAL are triggered by the block 16 to one or the other of their stable states according to the fact that their corresponding processors are respectively available or actuatable.

The snychronization mechanism is then very simple. The tasks management block 16 being actuated by an external resource demand DR or by a system instruction IS, i.e. by an instruction relative to one or more tasks to be executed, it classifies the latter. The arrival of an instruction relating to one of the tasks attributed to an available processor makes the latter actuatable. In this case, the management block 16 memorizes this change in the corresponding flip-flop of register 19.

If, in addition, the new actuatable processor has the priority over the active processor, the management block 16 triggers the flip-flop EXD (17) and transfers the control to the basic executive module 13. The latter tests the flip-flop EXD and transfers the control to the management block 14 which discontinues the execution of the task being performed and controls the transfer of the content of the registers of the local memory 4 (see FIG. 1) to the unit of the memory 6 attributed to the control block of the task which has been discontinued. It proceeds to the test of flip-flops BCR, BTR, BCMX and BCAL of register 19 for determining the task coming at the top of the task list associated to the new actuatable processor and actuates the register 18 for memorizing the nature of the processor to which the processing system is attributed. It subsequently controls the transfer of a certain number of words taken from the control block of the new task (context) of the registers of the local memory 4. In particular one of said words is transferred to the ordinal counter thereof. This latter operation is usually called "initialization".

The management block 14 transfers again the control to the basic executive unit 13 and commutates the latter to the priority processor by an operation usually called initialization. The basic unit 13 controls the reading of the ordinal counter and the reading of the corresponding instruction and transfers the latter to the instruction register 3. It proceeds to the test of the register 18 for interpreting the code of an instruction contained in the instruction register 3 either as an instruction relating to computation or as a channel instruction relating to a data transfer.

When all the operations corresponding to this new task having priority is terminated, the basic executive unit 13 transfers the control to the management block 14, which again controls the transfer of the content of the block controlling the task which has been interrupted to the registers of the local memory 4. The execution of the interrupted task may then start again.

Each potential processor will be defined by the assembly consisting of the corresponding flip-flop of register 19, one word of the memory which contains the address of the describer of the first task executable on said processor, the basic executive module 13 and the secondary module 131–134 specialized for this processor. The summing up of the above-mentioned sequences of operations is achieved in accordance with the following:

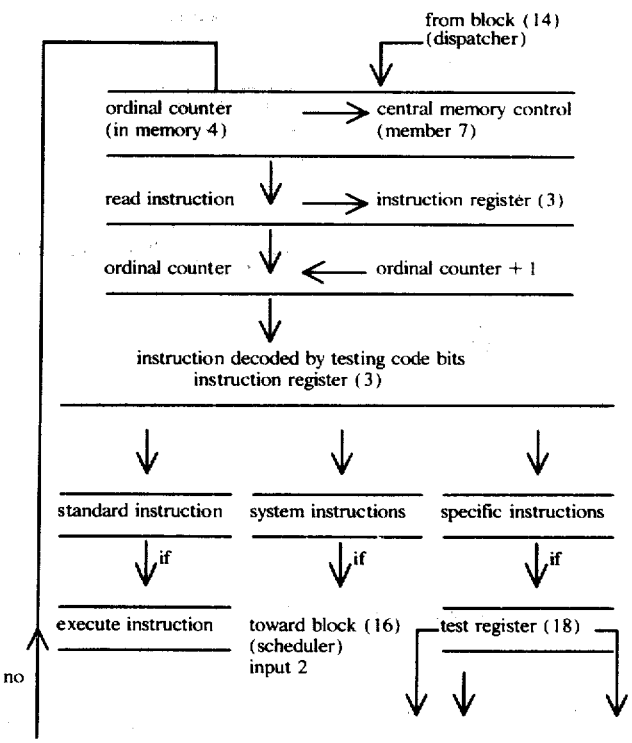

Chart 1-continued
"Basic executive" unit 13
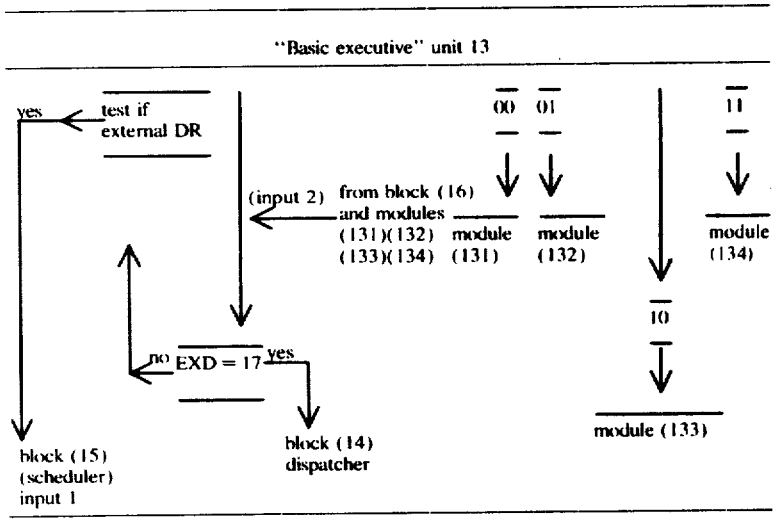
Chart 2
a) specialized modules (132),(133),(134)
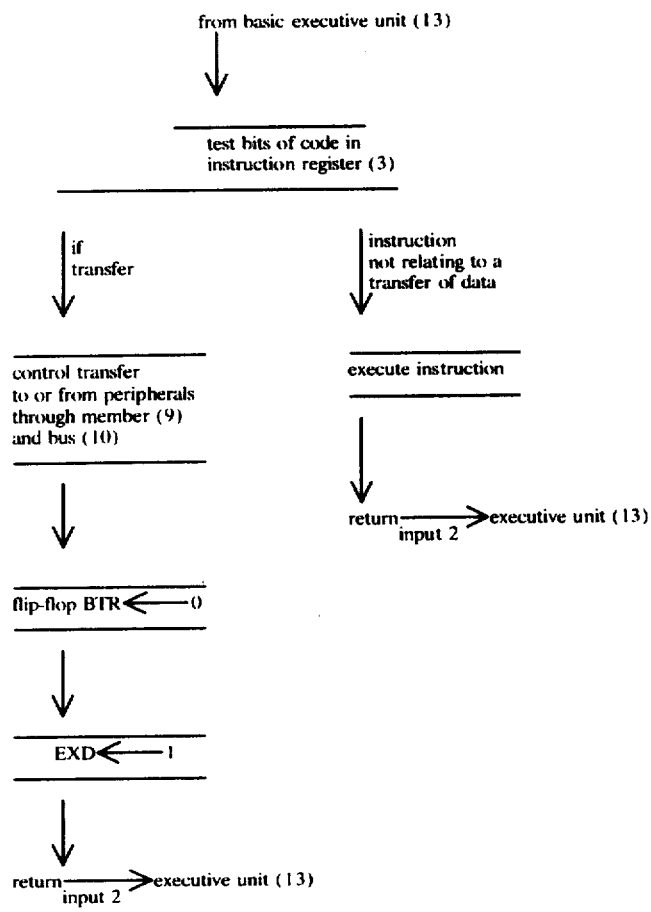
b) specialized module for computing process (131)

Chart 2-continued
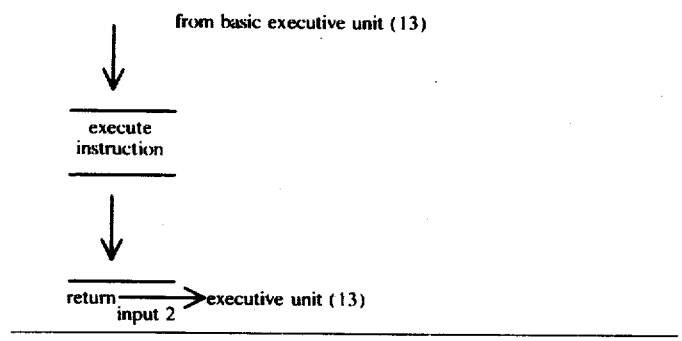
Chart 3
block 13 (scheduler)
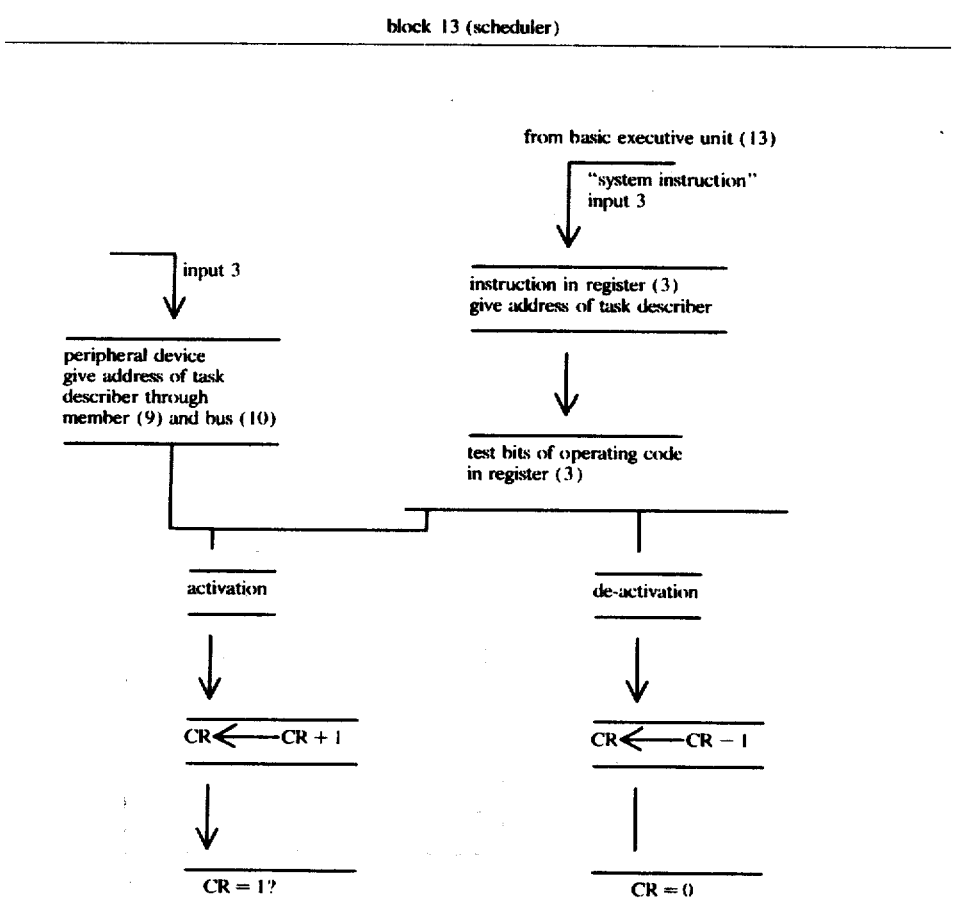

Chart 3-continued
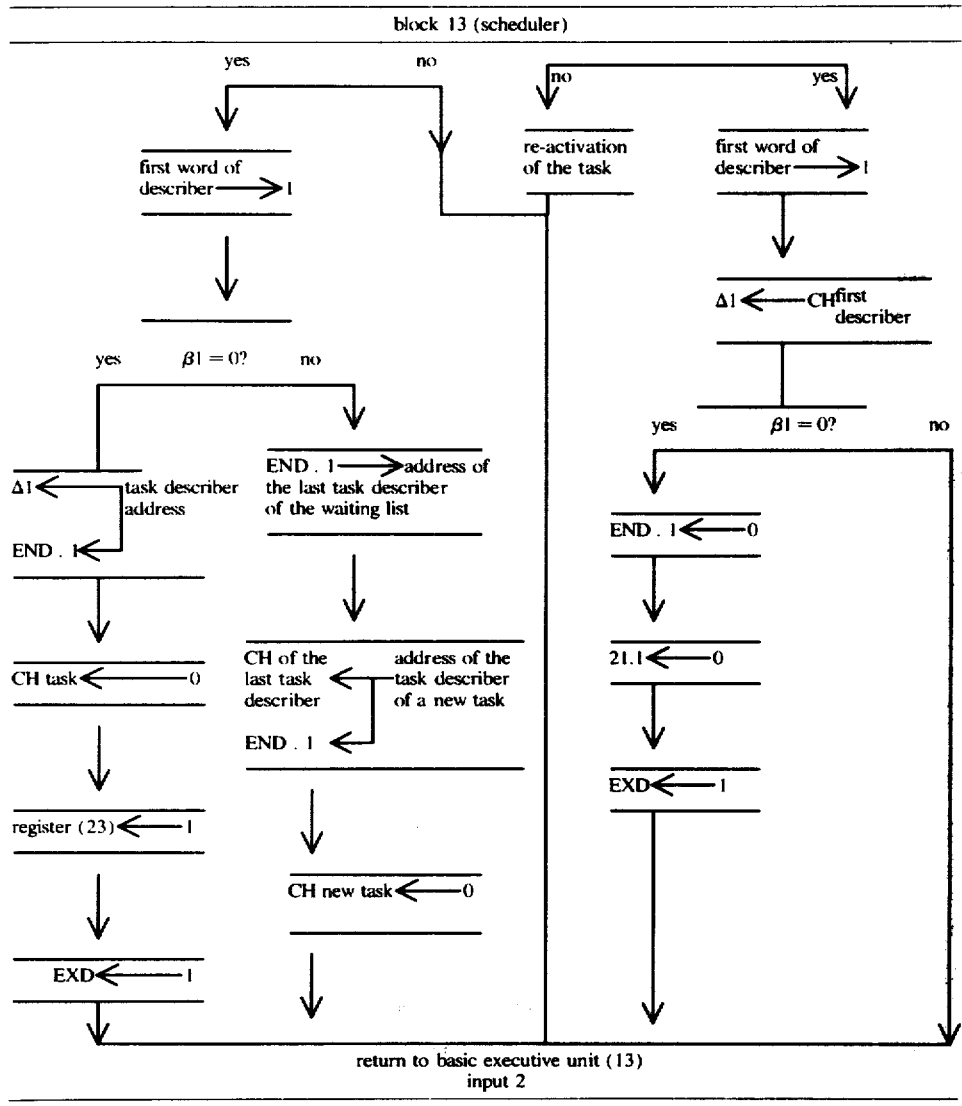
Chart 4
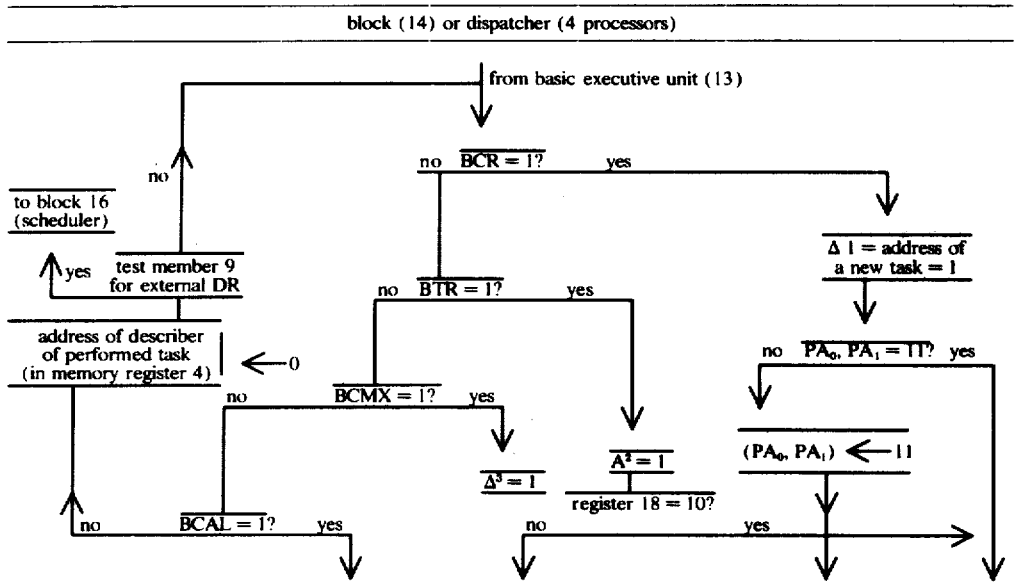

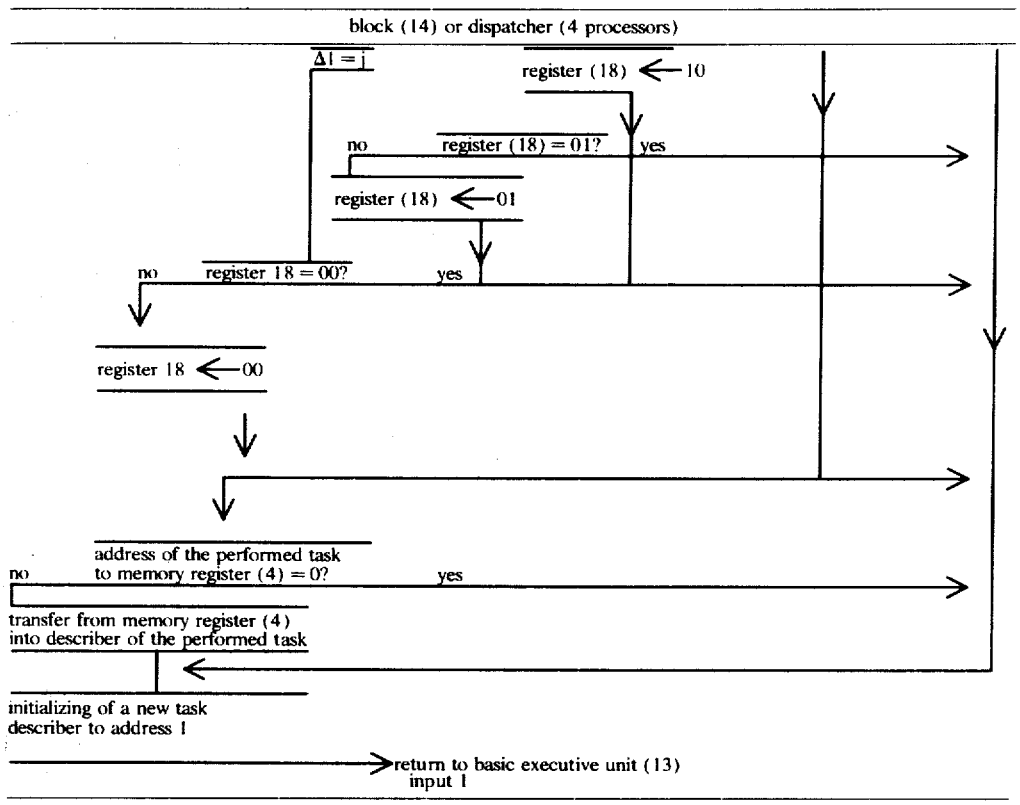

Chart 4-continued

In the embodiment illustrated in FIG. 3, four processing units 20, 21, 22 and 23, identical to that above-described, are connected through an omnibus cable 24, to the alive central memory 6. Each of these units is also connected to an assembly of peripheral devices of its own through bus cable 251, 252, 253 and 254. Said assemblies are not shown on the figure.

In accordance with said structure, any channel program will be attributed not only to a determined potential processor but also to a single computing unit. A specific waiting list of channel programs will then be established for each channel processor of each computing unit. On the contrary, the whole computation program will be executed indifferently by any of the four computing units.

A single waiting list of computing programs may be established and will be available to the four computing units.

Each task is associated to a task describer, i.e. an assembly of words defining it and whereby said task may be executed or preserved in case of interruption. Each task described contains in its first word a first group of two binary digits defining the computation unit on which must be executed said program and a second group of two binary digits which define the potential processor on which the task must be executed.

In the case of a computing program, the state of the first group of digits is not significant since this program may be performed on anyone of the computation units.

The central memory 6 includes the address of the first task selected for each processor. Each computing unit comprises three channel processors and one computing processor. As a total, the assembly of the four computing units comprises thirteen processors. An equal number of words is accordingly included, with a fixed address, in the central memory 6.

Each task comprises the address of the first actuatable task ADT and a binary digit S defining whether the corresponding processor is actuatable. The combination of the address with the digit S defines the state of the processor, with:

ADT = 0, meaning processor available

ADT ≠ 0 and S = 1, meaning actuatable processor, and

ADT ≠ 0 and S = 0, meaning processor in waiting condition.

The state of the processor in activity is defined by the flip-flops PAO and PA1 of register 18 (see FIG. 2) of each computing unit. The thirteen words respectively corresponding to the thirteen processors are, in each computing unit, permanently controlled by different management blocks 16 and tested by blocks 14 adapted to perform the management of the waiting list of the processors.

The dialogue between the computing units is performed by the management of these thirteen words of the central memory upon control of a synchronization system comprising a synchronized interconnection system between the different elements of the microprogrammed memories as well as a system for determining a priority between the computing units.

The connection system associated to each computing units comprises (FIG. 4) an assembly 26 connected to the management block 16 of the waiting lists of the actuatable tasks. The assembly 26 comprises a decoder (27) 2 bits/4 bits, of a known type, connected to the internal bus cable 11 (see FIG. 1). The four output channels of this decoder are respectively connected to a first input of four AND gates 281, 282, 283 and 284, the second input of which is connected to the output of the management block 16.

The outputs of the four AND gates 281, 282, 283 and 284 are respectively connected to four bus cables 291, 292, 293 and 294 associated to four computing units.

The blocks for management for the waiting lists of the actuatable tasks 161, 162, 163 and 164 of the four units are connected to four external bus cables 291, 292, 293 and 294 through the assembly 26.

The flip-flops 171, 172, 173 and 174 (FIG. 5), used for memorizing the state of an actuatable processor to which a priority is given, have a first input connected respectively to four bus cables 291, 292, 293 and 294 and a second input connected respectively to four blocks 141, 142, 143 and 144 to which is attributed the management of the processors of the respective computing units.

This system provides for the interconnection of the computing units.

When one of the management blocks 161, 162, 163 and 164 has determined the waiting list of the tasks associated with a processor having priority and has made the latter actuatable, it performs the reading of the first word of the describer of the task having a priority in its list and controls the transmission of said word to the internal bus cable 11. One of the decoders, such as 27, controls the opening of the AND gates 281, 282, 283 or 284, and the transmission of the actuating order of block 161–164 to one of the external bus cables 291–294 and consequently to the input terminal of flip-flop 171, 172, 173 or 174 associated with said cable. The two binary digits transmitted from an internal bus cable 11 to a decoder 27 are taken up from the portion of the first word of the task describer defining the number of the relevant computing unit.

Such interconnection system makes it possible for each management block 161–164 to actuate anyone of flip-flops 171–174 without knowning before the computing unit which will receive the actuation signal from the flip-flop. The destination is only contained in the task describer. Accordingly, the management blocks 161–164 are completely identical while having access to all the tasks stored in the memory. The computing units differ from each other only by their connections to the external bus cables.

By this system it is possible for a computing unit to take into account the fact that one of its processors is passed from the available state to the actuatable state.

The communication between the processing unit being performed through one of the 13 words of the memory respectively corresponding to the 13 processors, these units must never modify nor test these words simultaneously. For this purpose, the device comprises a system for determining a priority between the computing units.

The system having priority, associated to each computing unit, comprises (FIG. 6) a first bistable flip-flop DSY controlled by microprograms included in the management blocks 14 and 16 (FIG. 2) of each processing unit, a second bistable flip-flop ESY, a bus cable 30 and a conductor 31 common for all the systems having priority and logic gates for connecting these elements to one another.

The output of an AND gate 32 is connected to one of the inputs of flip-flop ESY. The three inputs of said gate are respectively connected to the output reference Q of the flip-flop DSY, to the conductor 31 through an OR gate 33 and to the output referred to as $\overline{Q}$ of the flip-flop ESY through an AND gate 34 and an inverter 35 connected in series. The output Q of the flip-flop ESY is connected to the input of the OR gate 33, to the input of an AND gate 36 and to the test bus cable 12, not shown (see FIG. 1) through a cable 37. The bus cable 30 is connected to the output of the AND gate 36 and to the input of the AND gate 34. The output $\overline{Q}$ of the flip-flop DSY controls an AND gate 38 inserted between any two priority systems associated to two consecutive computing units.

At the beginning of each microprogram associated with each of the management blocks 14 and 16 of each computing unit, we introduce a micro-instruction relating to a microprogrammed management demand of the thirteen words of memory corresponding to the thirteen processors.

In the absence of such a demand from a microprogram, the AND gates 38, controlled by the signal issued from the output $\overline{Q}$ of each flip-flop DSY, are released and the actuation signal is present all along the conductor 31.

A management demand from one computation unit results in an activation of the corresponding flip-flop DSY by the signals issued from the micro-instructions S and in the locking of the associated AND gate 38. Accordingly, the actuation signal is no longer transmitted to the other priority systems after said gate.

The activation of a flip-flop DSY results in the release of the corresponding AND gate 32 and in the triggering of the flip-flop ESY through a signal issued from a clock, not shown, said flip-flop then indicating that the management demand issued from a computing unit has received the priority and that the others must defer such demands.

The state of the flip-flop ESY is transmitted through cable 37 to the test bus cable which informs the computing unit having issued the demand of the priority order thereto.

The actuation of the flip-flop ESY results in the activation of the omnibus cable 30 and in the closure, through the AND gate 34 and of the inverter, of the AND gate 32 of the priority systems upstream the AND gate 38 which has been blocked by the demand having priority. When the management object of the demand has been completely performed, the flip-flop DSY is reset to zero by a signal R issued from a micro-instruction pertaining to the management block. This reset to zero of DSY makes it possible to satisfy the management demand of other units.

This arrangement has for object to establish a hierarchy between the computing units and to prevent that several of them simultaneously intervene in the management of the thirteen words of memory.

The control member 7 includes logic elements under control of the microprograms from the ROM 1 and connected with the memory bus 8 which comprises at least six lines. The control member 7 comprises a first flip-flop 39 (FIG. 7) whose inputs are connected respectively with the decoding register ROMR (FIG. 1) of the ROM ($\mu$P) and with a line: "cycle end".

A first output of the first flip-flop, as shown in FIG. 7, is connected with a first input of a first AND gate 40, of which a second input is connected respectively with a line "cycle demand" and a line "priority" of the memory bus 8 and a third input is connected with a line "bus loaded" through an inverter 41 and an AND gate 42 whose control input is connected with a first output of a second flip-flop 43. The output of the first AND gate 40 is connected with a first input of the second flip-flop 43 whose second output is connected with the line cycle demand, with the line bus loaded through a third AND gate 44 and with switching devices 45, 46 controlling respectively the transfer of data between an address register CMAD and the line "address" of bus 8 and between a data register CMR and the line "data" of the same bus. The register CMAD and CMR are connected with data bus 11. The second input of flip-flop 39 controls an AND gate 47 through which the line priority of the bus 8 is connected with other similar AND gates associated with the other processing units.

When a processing unit needs an exchange of data with the central memory, data to be transferred and the associated transfer address are respectively conveyed to the registers CMR and ADMC and flip-flop 39 is actuated, under control of the microprogram. It results in the separation of sections of the line priority upstream and downstream the AND gate 47. Moreover, if on the one hand section upstream the AND gate 47 is activated, i.e. no processing unit has previously requested an exchange with the central memory, and the other hand if no transfer is in progress (line bus loaded not activated), AND gate 40 opens and flip-flop 43 is actuated. Consequently:

AND gate 44 opens allowing the activation of the line bus loaded, and data and address stored in registers CMR and CMAD respectively are dispatched to data line and address line, (transfer to the central memory) or, address is transmitted to the address line and data register CMR is commutated to receive data from date line (transfer from the central memory).

A signal exciting the central memory is directed to the line cycle demand by the actuation of flip-flop 43.

When a read or write cycle is achieved, a signal is transmitted by the central memory on the line cycle end and flip-flop 39 is reset.

Another processing unit can then converse or exchange data with the central memory.

The member 9 for controlling data transfer between a processing unit and peripheral $P_1, P_2 \ldots P_4$ is connected with the peripheral bus 10 which comprises as many lines $L_1, L_2, \ldots L_4$ as peripheral connected with the processing units plus four lines referenced data address "ACQ", and "TRF".

The member 9, as shown in FIG. 8, comprises an encoder 51 whose inputs are connected with the lines $L_1, L_2 \ldots L_k \ldots L_n$ assigned respectively to the exchange demands from a peripheral to the processing units. A first output of encoder 51 is connected with the test bus 12 and a second output is connected with an address register 48 through a switching device 52 controlled by the microprogram. The address register 48 and a data register 49 are connected with the data bus 11. The inputs of a flip-flop 50 are connected with the ROM 1 storing the microprogram ($\mu P$) and with the line ACQ. One of the outputs of the flip-flop 50 is connected with the line TRF and the control inputs of switching devices 53, 54 through which transfers between the address register 53 transfer, register 54 and the corresponding lines address and data are achieved.

When one peripheral $P_k$ (possibly several) requests data exchange with a processing unit, a signal from said peripheral is transmitted on line $L_k$. A "1" is then provided on the first output of encoder. By testing encoder through test bus 12, the microprogram can break off a current task to attend to the transfer requested. A coded signal corresponding with the address of the peripheral having priority (if several requests at the same time) is also provided at the second output of encoder 51.

Upon control of the microprogram the address of peripheral having priority is transferred into the address register 48 and the flip-flop 50 is actuated. The latter produces a control signal on the line TRF (transfer) while allowing the transmission of the address on the address line and either the trnsmission of data from data register 49 onto the data line (data transfer to the peripheral) or the connection of data register 49 to data line (for reception of data from peripherals).

Having decoded its own address on the address line, the peripheral proceeds to the requested data transfer. When the transfer is finished, the peripheral sends a signal of acquittance (ACQ) which resets flip-flop 50.

The device may be subjected to modifications without departing from the scope of the present invention. For example, instead of using a register such as 19 (see FIG. 2) in order to define the state of the actuatable processors, i.e. three binary digits relating to channel processors plus a common digit for all the units defining the state of the actuatable computing processor, these digits may be classified in the central memory. This modification may be used when the test of these binary digits does not intervene frequently and that, accordingly, the introduction of supplementary means for memorizing the state of the processor is not justified.

We claim:

1. In a system comprising a plurality of data processing system units coupled to a central memory and a plurality of peripheral units, each data processing system unit comprising an instruction processing means, means for exchanging data with the peripheral units through at least one data transfer channel and a microprgammed means including means for decoding microinstructions, said microprogrammed means including a first managing system means for controlling the execution of instructions stored in said central memory, a second managing system means for defining a hierarchy between task lists, each task list including tasks of the same type which can be executed only through said means for exchanging data or only through said instruction processing means and for making said instruction processing means available for processing the task heading the priority task list, a third managing system means for storing lists of tasks to be executed and for arranging actuatable tasks of the same type respectively in the corresponding task lists, and means for synchronizing said first, second and third managing system means comprising a first storage means connected with said second and third managing system means for storing a signal from said third managing system means indicating the current state of the task lists and providing an output to said second mangaging system means in accordance therewith, a second storage means connected with said first, second and third managing system means for storing a signal from said third managing system means indicating that an actuatable task takes priority over the currently active task and for providing an output to said first management system means in accordance therewith, and a third storage means connected with said first and second managing system means for storing a signal from said second managing system means indicating the type of task being performed and providing an output to said first management system means in accordance therewith, the improvement comprising a system coupling means for coupling said data processing system units with each other and with said central memory including a plurality of commutating means connected respectively to an associated data processing system unit, each commutating means having a number of outputs equal to the number of data processing system units, and decoding means for establishing a connection path through said commutating means and being responsive to a signal from said third managing system means of any one of said data processing system units for outputting a signal to said second storage means of a designated one of said data processing system units.

2. A system according to claim 1, wherein each commutating means comprises a number of AND gates equal to the number of data processing system units and the associated decoding means are connected with a bus cable which is coupled to said central memory.

3. A system according to claim 1, wherein each data processing system unit is associated with a validating system comprising communication memory means for storing communication demands from the data processing system unit, recording means for recording the validation of communication demands, validating means actuated at least by said storing means for validating the demands, said system further comprising validating synchronizing means for synchronizing said validating systems by blocking validating elements associated with the processing units whose communication demands is subsequent to a validated demand.

4. A system according to claim 3, wherein the validating synchronizing means comprises a circuit for connecting in series said validating means of the different validating systems, means for delivering on said circuit a signal for actuating said validating means, means inserted between the validating means for interrupting the transmission of the actuating signal upon control of said communication memory means and a circuit for interconnecting the recording means for recording the validation of the demands.

5. A system according to claim 4, wherein the recording means for recording the validation of each system comprises a bistable flip-flop, the validating means comprise a first AND gate having one input connected with a circuit consisting of a second AND gate connected with a first output terminal of said bistable flip-flop and with the interconnecting circuit, in series with a logic element for inverting the signal delivered by said second AND gate, and wherein the circuit interconnecting said systems is connected, through a third AND gate, with the second output of said bistable flip-flop.

6. A system according to claim 5, in which the communication memory means comprises a bistable flip-flop having one terminal connected with one of the inputs of said first AND gate and the other terminal connected with the interrupting means.

7. A system according to claim 5, wherein one of the inputs of the first AND gate is connected to an OR gate whose inputs are respectively connected with the interconnecting circuit and with the second output of said flip-flop.

* * * * *

UNITED STATES PATENT AND TRADEMARK OFFICE
CERTIFICATE OF CORRECTION

PATENT NO. : 4,015,242
DATED : March 29, 1977
INVENTOR(S) : Francois Anceau, etal It is certified that error appears in the above-identified patent and that said Letters Patent are hereby corrected as shown below:

Title page, (73) Assignee, which now reads:

"(73) Assignee: Institut Francais du Petrole, des Carburants et Lubrifiants et Entreprise de Recherches et d'Activities Petrolieres, Elf, France"

should read:

--(73) Assignee: Institut Francais du Petrole,Des Carburants et Lubrifiants, France--

Signed and Sealed this

Twenty-fourth Day of April 1979

[SEAL]

Attest:

RUTH C. MASON
Attesting Officer

DONALD W. BANNER
Commissioner of Patents and Trademarks